United States Patent Office 3,408,442
Patented Oct. 29, 1968

3,408,442
CONTROLLING SOIL INSECTS WITH PARATHION-PENTACHLOROPHENOL COMPOSITIONS
John M. Deming, Hazelwood, Mo., assignor to Monsanto Company, St. Louis, Mo., a corporation of Delaware
No Drawing. Filed Apr. 20, 1964, Ser. No. 361,259
7 Claims. (Cl. 424—218)

ABSTRACT OF THE DISCLOSURE

A method of controlling insect life in soil by the use of a mixture of parathion and pentachlorophenol whereby the degrading effect of soil microorganisms on parathion is substantially reduced.

---

This invention relates to novel formulations useful in the control of soil insect populations, and especially the insects which infest soil during the larvae or pupal stages. More specifically, the invention is concerned with a procedure for upgrading insecticides and increasing the longevity of insect toxicants, especially those which include parathion.

Parathion is a well known and widely used insecticide which has been used in the control of soil infesting stages of many insects. The parathion does not have longevity which enables it to maintain control over the objectionable organisms over long periods of time. Although parathion is toxic to most forms of animal and vegetable life, it appears to be decomposed by certain organisms found in the soil. The soil microorganisms are of such variety and so numerous that they are adaptable to any conditions which may exist in the soil. The parathion, like most organic compounds, is decomposed by some strains of these organisms, even though the parathion in high concentration is very toxic to many soil microorganisms.

One object of this invention is to provide a means of retarding the decomposition of parathion. In accordance with this invention, it has been found that pentachlorophenol, which is also subject to decomposition by the soil microorganisms, can retard the decomposition of parathion through its toxic effect on the said soil organisms. The particular soil microorganisms which decompose parathion survive the toxic effects and the soil organism increases in its ability to decompose parathion. It appears that the particular microorganisms are cultured in the soil and strains are developed which are more active in the decomposition of parathion. Thus, a further object of the invention is to provide a product with a longer soil life than parathion when added directly to the soil.

Compositions which provide this novel beneficial effect are those which contain from 50 to 95 parts by weight of parathion and 5 to 50 parts of pentachlorophenol. The control of soil insect life using the novel composition will involve the incorporation in the surface layers of the soil from 1 to 10 pounds per acre of the said mixture of parathion of pentachlorophenol. If desired, the insecticide mixtures may be formulated with a variety of insecticidal adjuvants. Of particular utility are the solid granular carriers, and especially those which have the ability to absorb or adsorb the active components, for example the bentonites, attapulgus clay, illite, activated charcoal, diatomaceous silica, dehydrated silica gel and vermiculite. To aid in the distribution of the parathion formulation and to prevent local excesses of the toxicant, it is desirable to have granules of relatively uniform particle size, for example from 10 to 100 mesh (U.S. Standard Screen size) and preferably from 20 to 40 mesh. The vermiculite is especially useful because it can be readily reduced to the desired size by crushing and screening to form granules which are relatively resistant to wear and other mechanical forces which may tend to reduce the particle size. The vermiculite is also useful because it is highly absorbent and will carry more than 100% of its own weight of the parathion composition.

The granular soil insecticides may contain from 30 to 95% by weight of the inert granular mineral and from 5 to 70% of a biological toxicant consisting of parathion and pentachlorophenol, in which mixture parathion is present to the extent of 50 to 99%. The longevity effect is more pronounced when higher proportions of the parathion mixture are used, for example from 10 to 50%. In order to absorb these quantities of parathion and pentachlorophenol, it will be necessary to have a very highly absorptive carrier, such as vermiculite. For absorbing smaller quantities of the principal toxicants, the clays, such as bentonites and attapulgites, will also be useful. Preferred granular soil treating compositions are those which contain from 30 to 95% of the granular carrier with 4.9 to 35% of parathion and from 0.1 to 25% of pentachlorophenol. For most active use, compositions containing from 40 to 88% of granular vermiculite, 10 to 50% of parathion and 2 to 50% of pentachlorophenol will be used.

Procedures for prolonging the life of the parathion involve the soil treatment of the above-described compositions. A preferred composition will consist of a granular carrier, which will be present to the extent of 100 to 500% by weight based on the parathion and from 1 to 100% by weight of pentachlorophenol also based on the parathion.

The compositions may be applied to the soil by depositing them uniformly on the soil surface or they may be introduced to the top layers of the soil by raking, harrowing or other cultivation procedures. The quantity of toxicant applied will be approximately that which is conventionaly used in the treatment of soil by parathion and which may be applied at several different times in order to provide a prolonged effect. In the use of the present invention the longer lived activity will be noticed and if a plurality of applications is required, the periods of time between applications will be much longer. In many cases, a single application will have substantial coverage through the entire growing season or at least until the plants have been established and are capable of resisting the insect larvae.

A further object of this invention is to provide a parathion formulation which has the ability to resist the degradative action of soil microorganisms. In accordance with this aspect of the invention, it has been found that when porous carriers are used in parathion formulations substantial improvement in longevity can be accomplished even without the inclusion of pentachlorophenol. In this modification of the invention, the toxicity of the high parathion content appears to inhibit the degradative organisms. This phenomenon is observed when the porous carirer absorbs or adsorbs 20 to 150 percent by weight of parathion based on the carrier weight. The most useful carrier for effecting these absorptive effects is vermiculite. The granular vermiculite, as above described, will comprise from 40 to 85% by weight of the formulation and contain from 15 to 60 percent of parathion. Generally, the preferred formulation will consist of granular vermiculite with the maximum quantity of parathion that the porous carrier can hold by either adsorption or absorption phenomena.

Experimental observations were made with 100 grams of moist soil at 100° C. in glass jars. The granular carriers with added parathion and with varying proportions of pentachlorophenol were added in quantities amounting to one to 50 pounds per acre assuming treatments 6″ deep of 4″ strips 36″ apart.

Example 1

Formulations of 50 parts of vermiculite and 50 parts of parathion containing from zero to 50 parts of pentachlorophenol aged at 100° C. The soil samples were assayed for parathion after the periods of time designated in table below.

| Parts Vermiculite | Parts Parathion | Parts Pentachlorophenol | Percent Parathion Remaining | | |
|---|---|---|---|---|---|
| | | | 1 wk. | 1 mo. | 2 mo. |
| 50 | 50 | 0 | 90 | 70 | 36 |
| 50 | 50 | 10 | 104 | 88 | 35 |
| 50 | 50 | 20 | ---------- | 84 | 56 |
| 50 | 50 | 30 | 94 | 86 | 47 |
| 50 | 50 | 40 | 100 | 82 | 53 |
| 50 | 50 | 50 | 93 | 81 | 56 |
| 80 | 20 | 0 | 82 | 36 | 10 |
| 80 | 20 | 10 | 87 | 62 | 24 |
| 80 | 20 | 20 | ---------- | 66 | 35 |

This demonstrates that longevity of parathion in the soil is enhanced by the presence of pentachlorophenol.

Example 2

The procedure of Example 1 was repeated except formulations of 40% parathion with varying proportions of vermiculite and pentachlorophenol were studied.

| Percent Vermiculite | Percent Parathion | Percent Pentachlorophenol | Percent Parathion Remaining | |
|---|---|---|---|---|
| | | | 22 days | 41 days |
| 60 | 40 | 0 | 67 | 54 |
| 59 | 40 | 1 | 77 | 60 |
| 58 | 40 | 2 | 73 | 58 |
| 56 | 40 | 4 | 78 | 59 |
| 54 | 40 | 6 | 74 | 59 |
| 52 | 40 | 8 | 79 | 62 |

Example 3

Other formulations of lower parathion content were examined.

| Percent Vermiculite | Percent Parathion | Percent Pentachlorophenol | Percent Parathion Remaining | |
|---|---|---|---|---|
| | | | 10 days | 30 days |
| 80 | 20 | 0 | 80 | 50 |
| 60 | 20 | 10 | 94 | 70 |
| 60 | 20 | 20 | 92 | 68 |

These data show that improvements in longevity can be obtained with as low as 25% parathion on vermiculite.

Example 4

Using the procedure described above, formulations containing only parathion and vermiculite were studied at 100° F. Granular formulations of the composition containing 10 to 50% parathion on granular vermiculite were studied.

| Percent Parathion | Percent Vermiculite | Longevity | | |
|---|---|---|---|---|
| | | 1 wk. | 4 wks. | 8 wks. |
| 50 | 50 | 90 | 69 | 52 |
| 40 | 60 | 87 | 62 | 43 |
| 30 | 70 | 85 | 54 | 31 |
| 20 | 80 | 83 | 45 | 22 |
| 10 | 90 | 73 | 22 | 5 |

Although the invention may be practiced with a wide variety of different compositions and by various procedures of cultivation well known to those skilled in the agricultural art, the most desirable compositions and procedures are set forth with respect to the following claims.

What is claimed is:

1. A method of controlling soil insect life which comprises incorporating in the soil from about 1 to about 10 pounds per acre of a mixture of about 50 to about 99% by weight of parathion and about 1 to about 50% of pentachlorophenol.

2. A method of controlling soil insect life which comprises introducing into the soil from about 1 to about 20 pounds per acre of an insecticide consisting essentially of from about 30 to about 95% by weight of an inert granular mineral, and from about 5 to about 70% of a mixture of parathion and pentachlorophenol, said mixture consisting essentially of from about 50 to about 99% of parathion and about 1 to about 50% of pentachlorophenol.

3. A method of treating soil which comprises introducing into the surface layer of soil from about 1 to about 20 pounds per acre of an insecticide consisting essentially of from about 30 to about 95 percent by weight of a granular vermiculite, from about 4 to about 50 percent of parathion and from about 1 to about 30 percent of pentachlorophenol.

4. A method of controlling the insect population in soils which comprises introducing into the surface soils from about 1 to about 20 pounds per acre of a composition consisting essentially of from about 50 to about 90% by weight of a granular vermiculite, from about 5 to about 35% of parathion and from about 5 to about 25% of pentachlorophenol.

5. A method of prolonging the life of parathion in soil treating procedures which comprises simultaneously treating the soil with a mixture of parathion and pentachlorophenol, wherein the pentachlorophenol is from about 1 to about 100% by weight of the parathion.

6. A method of controlling the insect population in soils which comprises introducing into the surface soils from about 1 to about 20 pounds per acre of an insecticide consisting essentially of from about 80 to about 95% by weight of an inert granular mineral and from about 5 to about 20% of a mixture of parathion and pentachlorophenol wherein the pentachlorophenol is about 1% by weight of the parathion.

7. A method of prolonging the life of parathion in soil treating procedures which comprises treating the soil with a mixture consisting essentially of parathion and pentachlorophenol wherein the pentachlorophenol is about 1% by weight of the parathion.

References Cited

UNITED STATES PATENTS

| | | | |
|---|---|---|---|
| 2,750,323 | 6/1956 | Schmitz-Hallebrech et al. | 154—140 |
| 3,062,709 | 11/1962 | Ordas | 167—30 |
| 3,083,089 | 3/1963 | Renner | 71—2.4 |
| 3,089,807 | 5/1963 | Trademan et al. | 167—22 |
| 3,093,536 | 6/1963 | Loeffler | 167—22 |

FOREIGN PATENTS 266,295    4/1950    Switzerland.

ALBERT T. MEYERS, *Primary Examiner.*

V. C. CLARKE, *Assistant Examiner.*